United States Patent [19]
Rodriguezferre

[11] Patent Number: 5,437,573
[45] Date of Patent: Aug. 1, 1995

[54] STRUCTURE FOR CHILDREN'S GAMES

[76] Inventor: José M. Rodriguezferre, Poligono Industrial Derramador, Albacete s/n-03440-IBI, Alicante, Spain

[21] Appl. No.: 167,090

[22] Filed: Dec. 16, 1993

[30] Foreign Application Priority Data

Dec. 24, 1992 [ES] Spain .................................. 9202609

[51] Int. Cl.6 .............................................. A63G 21/00
[52] U.S. Cl. .................... 472/116; 472/136; 482/35; 403/381; 403/387; 52/281; 52/282.3; 52/284
[58] Field of Search ...................... 472/116, 136, 137; 403/331, 387, 38 L, 375; 482/35, 36; D21/242, 243, 244, 245, 246; 52/245, 281, 282.1, 284 282.3, 239

[56] References Cited
U.S. PATENT DOCUMENTS 3,780,469 12/1973 Hancovsky .................... 472/116 X
4,941,658 7/1990 Poo ........................................ 482/35
5,137,271 8/1992 Frankel ................................ 482/35

Primary Examiner—Carl D. Friedman
Assistant Examiner—Kien T. Nguyen

[57] ABSTRACT

A modular play structure for children's games includes a plurality of corner components and a plurality of side components in which the assembly thereof are integrated. The corner components are formed by oblique extensions of material having an alternate slope with the free edges thereof curved inwards in opposite directions to form longitudinal guideways in said corner components for sliding and retaining edges of the side components which extend along the vertical sides of the side components, with which they are connected by thinner portions (20). The structure is applicable to the assembly and dismantling of constructions for children's games, without the need of auxiliary tooling or independent connecting means for the components integrating the structure.

16 Claims, 3 Drawing Sheets

STRUCTURE FOR CHILDREN'S GAMES

BACKGROUND OF THE INVENTION

The present Patent of invention relates to a new structure for children's games which provides an easily assembled modular play structure particularly suited for use by children.

DESCRIPTION OF RELATED ART

There are presently known structures used by children in their games, installed in public or private parks, gardens or appropriate places and made from metal parts, molded material parts or others, fixedly attached together to form random shapes forming precincts accessible to the children, planes on different levels or places to climb, passageways, staircases and slides which to descend, all designed so that the child may use them in his games, depending on his imagination, physical capacity and development, without running any risk of injury.

Nevertheless, all these currently known facilities are fixed, i.e. they are attached to the ground, forming permanent, fixtures, unless dismantled by specialized personnel, using the appropriate means allowing the joints between the various components and the anchorages holding them to the ground to be released.

There are currently no known facilities of this type which may be assembled and dismantled, both indoors and outdoors, with ease and without the need to have auxiliary means, and also allow for storage of the various component parts in a small space, when so desired.

SUMMARY OF THE INVENTION

In the present invention, there has been devised a structure formed by a plurality of components made from rigid molded material and including means for the assembly thereof, either by engagement, sliding, plugging or other systems, but always without the need to use complementary binding members, so that the structure may be assembled and dismantled with ease, even by a child user himself.

Some of the components form corner modules and wall modules, to form a prismatic structure providing a precinct communicating at the top with the outside and through openings in the wall modules, through which the child may have access. Inside the precinct there is provided at least one raised horizontal member forming a platform located at a level attainable by the child, from which he may reach a slide or like component, external to the precinct, along which he may slide to the ground.

According to the foregoing, the structure is adapted to be assembled either outdoors or indoors and may also be transported and stored, after being dismantled, in a small space in a motor vehicle or at home.

The structure of the present invention offers the advantages described above, apart from others which will be easily gathered from the embodiment described in fuller detail hereinafter to facilitate an understanding of the above mentioned features, while disclosing at the same time several details. For such purpose, the specification is accompanied by drawings in which a practical embodiment of the invention is shown as a non-limiting example of the scope of the present invention.

DESCRIPTION OF ONE PREFERRED EMBODIMENT OF THE INVENTION

Figure 1:
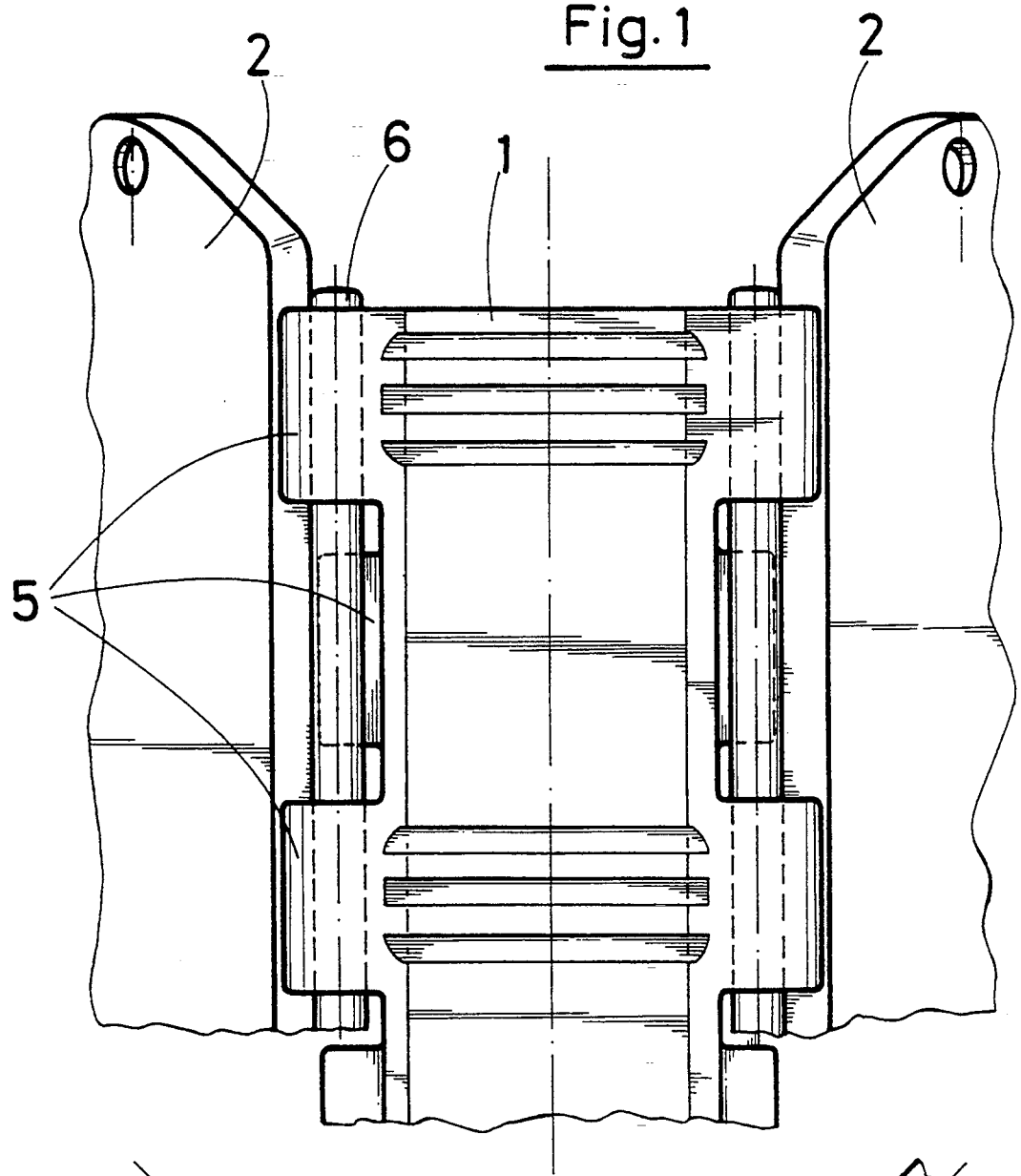
FIG. 1 is a detail perspective view showing how the corner modules and the wall modules are joined together.
Figure 2:
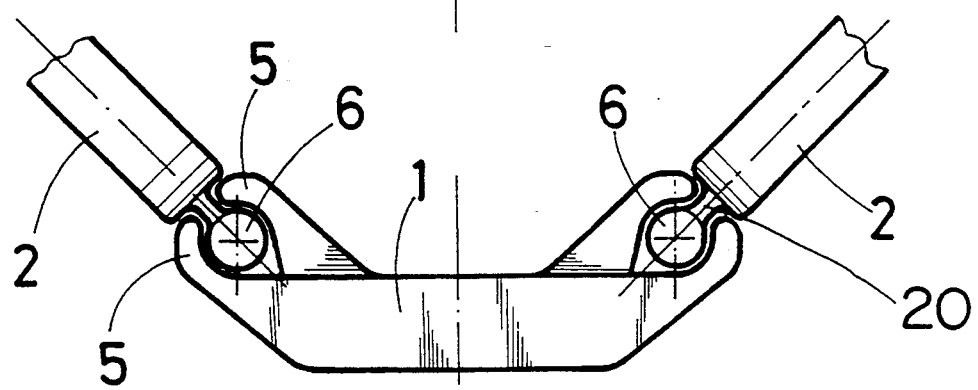
FIG. 2 is a top view of the previous Figure contributing to an understanding of the joining system between the modules.
Figure 3:
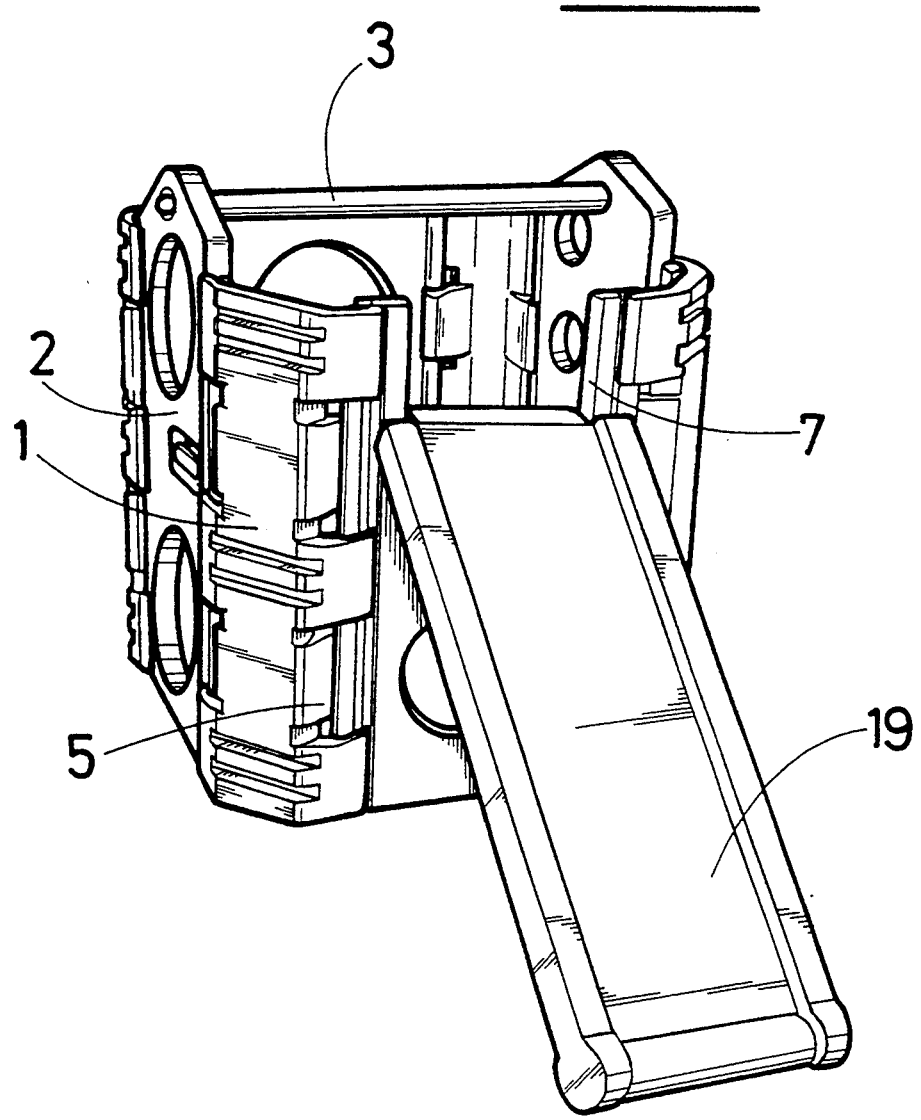
FIG. 3 is a perspective view of the structure assembled in a functional arrangement, according to one embodiment.
Figure 4:
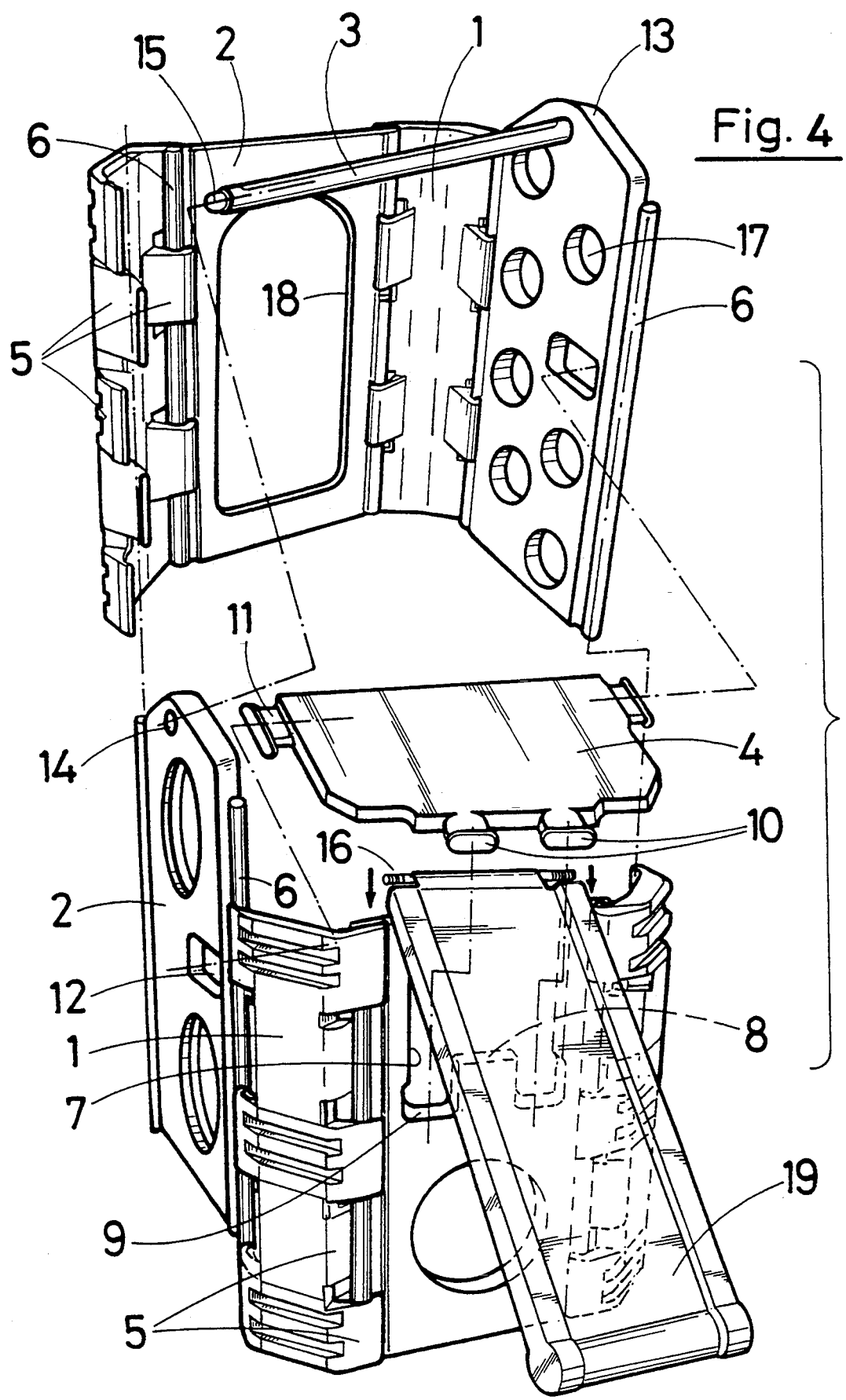
FIG. 4 is an exploded perspective view better showing the components forming the structure, some of which are connected together or partially connected in the assembly stage, also according to one embodiment.

There is to be seen in the drawings a structure for children's games comprising four corner components 1, four side components 2, a round bar 3, a part forming a horizontal platform 4 at an intermediate height and a slide member 19.

The corner components 1 are provided at the longitudinal edges thereof with alternately oblique extensions 5 of material curving inwards in opposite directions to form guideways for respective rounded edges 6 extending along the vertical sides of the side components 2 and which are connected thereto by way of smaller section material portions 20, enabling said edges 6 to slide axially in the guideways, forming inseparable connections when subjected to transverse pulling forces.

One of the side components 2 is provided with a rectangular gap 7 which is formed on the bottom edge thereof with a projection 8 forming recesses 9 on either side to receive respective projections 10 formed on the horizontal platform part 4. Additional projections 11 of horizontal platform part 4 are engaged in openings 12 of the adjacent components 2, providing for stable horizontal support of the horizontal platform part 4.

Two components 2 are provided at the top end thereof with respective pointed forms 13 with an orifice 14 for connection of the ends 15 of the bar 3.

The part forming the slide member 19 is provided at the upper end thereof with transverse projections 16 for engagement with the sides of the rectangular gap 7, being fixed in the operative position, as shown in the figures.

I claim:

1. A modular play structure formed of a plurality of parts of rigid molded material, in which there are integrated respective mating means to provide for the connection of parts to form a prismatic precinct open at the top and bottom of said structure, said structure including an upper bar connecting two opposite sides, a horizontal part, attached on three sides to the structure and situated at mid-height thereof, and an elongate rectangular part, provided with a longitudinal depression forming a track for a child to slide along, when said elongate rectangular part is situated on the outside of the structure and supported thereby, at the height of the horizontal part, in a sloping position, characterized essentially in that said modular play structure comprises
   a plurality of corner components and a plurality of side parts corresponding in number to said plurality of side components, the corner components being constructed by vertically extending rectangular parts, provided at the longitudinal edges thereof with oblique extensions of material having an alternate slope, the free edges of the oblique extensions curving inwards in opposite directions, forming longitudinal guideways on both sides of said corner component adapted axially to receive respective side component edges of a section appropriate to the cross section of the longitudinal guideway, said side component edges extending longitudinally parallel to the vertical edges of the side components, and connected thereto by a connecting member of a smaller thickness than each of said side component and said side component edge.

2. A modular play structure comprising:

a plurality of side components, each of said plurality of side components including a connecting edge on opposing lateral sides thereof;

a plurality of corner components corresponding in number to said plurality of side components, each of said plurality of corner components including vertically extending rectangular parts and provided at longitudinal edges thereof with oblique extensions of material having alternate slope, with free edges of the oblique extensions curved inwards in opposite directions for forming longitudinal guideways on both sides of the corner component, said longitudinal guideways axially receiving respective connecting edges therein, and wherein said connecting edges extend longitudinally parallel to vertical edges of each of said plurality of side components; and an extending member joining said side component with a respective connecting edge, said extending member having a thickness less than a thickness of said side component.

3. The modular play structure according to claim 2, further comprising an upper bar connected opposing ones of said plurality of side components.

4. The modular play structure according to claim 3, further comprising a horizontal platform member attached on three sides thereof to said plurality of side components and positioned at mid-height thereof.

5. The modular play structure according to claim 3, further comprising an elongate rectangular part, having a longitudinal depression forming a track therein, and means for connecting said elongate rectangular part to said modular play structure.

6. The modular play structure according to claim 3, wherein said plurality of side components and said plurality of corner components are constructed of molded plastic.

7. The modular play structure according to claim 2, further comprising a horizontal platform member attached on three sides thereof to said plurality of side components and positioned at mid-height thereof.

8. The modular play structure according to claim 7, further comprising an elongate rectangular part, having a longitudinal depression forming a track therein, and means for connecting said elongate rectangular part to said modular play structure.

9. The modular play structure according to claim 7, wherein said plurality of side components and said plurality of corner components are constructed of molded plastic.

10. The modular play structure according to claim 7, wherein said horizontal platform includes a first pair of projections on one side of said platform, said first pair of projections being seated in corresponding recesses formed in one of said plurality of side components, and a second pair of projections, with one member of said second pair of projections extending from opposing sides of said horizontal platform and orthogonal to said first pair of projections, said second pair of projections being inserted into corresponding openings formed in opposing ones of said plurality of side components.

11. The modular play structure according to claim 2, further comprising an elongate rectangular part, having a longitudinal depression forming a track therein, and means for connecting said elongate rectangular part to said modular play structure.

12. The modular play structure according to claim 11, wherein said means for connecting includes a transverse projection extending from opposing sides of said elongate rectangular part, the transverse projections being seated in a portion of said side component.

13. The modular play structure according to claim 2, wherein said plurality of side components and said plurality of corner components are constructed of molded plastic.

14. The modular play structure according to claim 2, wherein assembly of said plurality of side components together with said plurality of corner components forms a prismatic precinct open at an upper end and a lower end of said modular play structure.

15. The modular play structure according to claim 2, wherein the longitudinal guideways conform in shape to a corresponding connecting edge of said side component.

16. The modular play structure according to claim 15, wherein said connecting edge of said side component is rounded.

* * * * *